(12) United States Patent
LeMay

(10) Patent No.: US 7,400,310 B2
(45) Date of Patent: Jul. 15, 2008

(54) PULSE SIGNAL DRIVE CIRCUIT

(75) Inventor: Charles R. LeMay, Portsmouth, NH (US)

(73) Assignee: Draeger Medical Systems, Inc., Andover, MA (US)

( * ) Notice: Subject to any disclaimer, the term of this patent is extended or adjusted under 35 U.S.C. 154(b) by 262 days.

(21) Appl. No.: 11/288,046

(22) Filed: Nov. 28, 2005

(65) Prior Publication Data
US 2007/0120542 A1    May 31, 2007

(51) Int. Cl.
G09G 3/32 (2006.01)
H05B 41/16 (2006.01)

(52) U.S. Cl. .............. 345/82; 345/90; 345/91; 315/247; 315/224; 315/149; 315/291

(58) Field of Classification Search .......... 345/82, 345/90, 91, 247, 246, 224, 225, 149–159, 345/291, 307; 315/247, 246, 224, 225, 149–159
See application file for complete search history.

(56) References Cited

U.S. PATENT DOCUMENTS

| 6,724,376 | B2 | 4/2004 | Sakura et al. | |
|---|---|---|---|---|
| 6,748,180 | B2 | 6/2004 | Feng | |
| 6,853,150 | B2 | 2/2005 | Clauberg et al. | |
| 6,888,383 | B1 | 5/2005 | Fairbanks | |
| 2004/0251854 | A1* | 12/2004 | Matsuda et al. | 315/291 |
| 2005/0187447 | A1 | 8/2005 | Chew et al. | |
| 2005/0187452 | A1 | 8/2005 | Petersen et al. | |
| 2005/0243041 | A1 | 11/2005 | Vinn | |
| 2006/0022607 | A1* | 2/2006 | Hsu | 315/209 R |

* cited by examiner

Primary Examiner—Tuyet Vo
(74) Attorney, Agent, or Firm—Jack Schwartz & Associates, PLLC

(57) ABSTRACT

A pulse signal drive circuit includes an energy storage device. A source of energy supplies a substantially constant flow of energy to the energy storage device. A switch circuit draws repetitive pulses of substantially constant energy from the energy storage device to generate corresponding pulse drive signals.

14 Claims, 2 Drawing Sheets

PULSE SIGNAL DRIVE CIRCUIT

FIELD OF THE INVENTION

The present invention relates to drive circuits for generating pulse signals, and in particular to drive circuits for generating pulse signals for light emitting diodes (LEDs) in $SpO_2$ patient monitoring systems.

BACKGROUND OF THE INVENTION

In an $SpO_2$ transducer, light is generated by LEDs in response to pulse drive signals of substantially constant current through the LEDs. The optical signals produced by the LEDs are received by a photo-detector and converted to an electrical signal. The LEDs are sometimes conditioned to produce relatively low light levels (e.g. relatively low substantially constant current pulses). Under these operational conditions, it is possible for electronic (e.g. semiconductor) circuitry to induce sufficient noise in the driving pulse signals to become significant in subsequent generation of optical signals, and in reception and processing of the optical signals by the photo-detector. In addition, existing drive circuits draw pulses of current from a local power supply. The drawing of such pulses of current causes fluctuations in the power supply voltage output signal. These voltage fluctuations, in turn, induce corresponding fluctuations in signals within receiver circuitry, termed power supply crosstalk. Because of the timing of these disturbances, the receiver circuitry can incorrectly interpret them as representative of a received optical signal, thereby inducing a noise component into the received signal.

BRIEF SUMMARY OF THE INVENTION

In accordance with principles of the present invention, a pulse signal drive circuit includes an energy storage device. A source of energy supplies a substantially constant flow of energy to the energy storage device. A switch circuit draws repetitive pulses of substantially constant energy from the energy storage device to generate corresponding pulse drive signals.

Because the energy required to generate the drive pulse signals is taken from an energy storage device, instead of through electronic circuitry, noise induced by electronic circuitry, especially in the low light operational condition, is eliminated or minimized. In addition, because a system according to the invention draws a constant rather than pulsed current from the local power supply, there is no or minimal power supply crosstalk between the transmitter and the receiver circuitry. A system according to principles of the present invention, thus, is a low noise source of pulses such as are used to excite transducers.

DETAILED DESCRIPTION OF THE INVENTION

Figure 1:
FIG. 1 is a block diagram of a pulse signal drive circuit in accordance with principles of the present invention.

FIG. 1 is a block diagram of a pulse signal drive circuit in accordance with principles of the present invention. In FIG. 1, an output terminal of a source of energy 102 is coupled to an input terminal of an energy storage device 104. An output terminal of the energy storage device 104 is coupled to an input terminal of a switch circuit 106. An output terminal of the switch circuit 106 generates a pulse signal and is coupled to a system output terminal. The system output terminal is coupled to a load circuit (not shown) which utilizes the pulse signal.

In operation, the energy storage device 104 draws a substantially constant flow of energy from the energy source 102. The switch circuit 106 draws repetitive pulses of energy from the energy storage device 104 to generate corresponding pulse signals. Because the energy required to generate the pulse signals is taken from an energy storage device 104, instead of through electronic circuitry, noise induced by the electronic circuitry, especially in the low light operational condition, is eliminated or minimized. Because a substantially constant flow of energy is drawn from the energy source 102 by the energy storage device 104, there are no, or minimal, fluctuations in the energy drawn from the energy source 102, eliminating or minimizing power supply crosstalk.

After a possible initial adjustment period, the energy storage device 104 operates in an equilibrium condition. That is, the average flow of energy into the energy storage device 104 is equal to the average flow of energy out of the energy storage device 104. More specifically, in equilibrium the average amount of energy required to produce the pulse signals is substantially equal to the substantially constant flow of energy into the energy storage device 104 from the energy source 102.

For example, assume that a pulse signal having a 25% duty cycle is desired from the switch circuit 106. The energy source 102 is set to supply a desired amount of energy to the energy storage device 104. The switch circuit 106 is conditioned to draw current from the energy storage device 104 at a 25% duty cycle. In equilibrium, the current drawn by the switch circuit 106 from the energy storage device 104 is substantially equal to one-quarter of the predetermined substantially constant energy level of the pulses. In this manner, the energy storage device 104 remains in an equilibrium condition.

Figure 2:
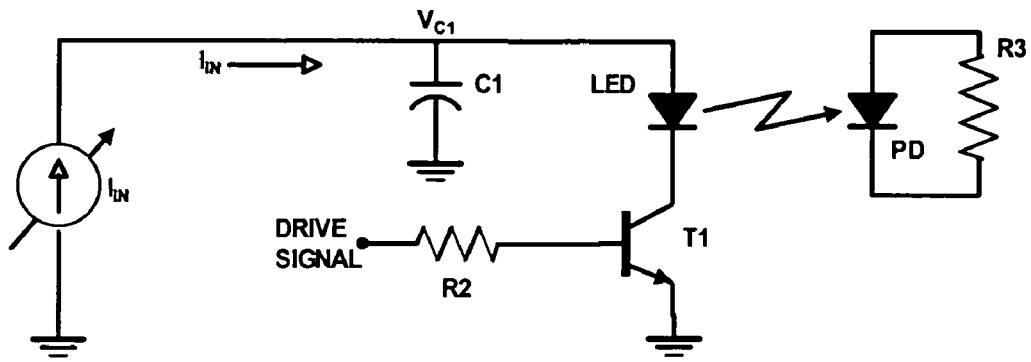
FIG. 2 is a schematic diagram of an embodiment of a pulse signal drive circuit in accordance with principles of the present invention.

FIG. 2 is a schematic diagram of an embodiment of a pulse signal drive circuit in accordance with principles of the present invention. Only those elements necessary to describe and understand the operation of the present invention are illustrated in FIG. 2. One skilled in the art understands what other circuitry is required in a working system, how to design and implement such circuitry, and how to connect such circuitry to the elements illustrated in FIG. 2.

In FIG. 2, a controllable constant current source $I_{IN}$ has a first terminal coupled to a source of reference potential (ground) and a second terminal coupled to a first electrode of a capacitor C1 and an anode of a light emitting diode (LED). A second electrode of the capacitor C1 is coupled to ground. A cathode of the LED is coupled to ground via a main conductive path of a transistor T1. That is, the cathode of the LED is coupled to a collector electrode of a transistor T1, and an emitter electrode of the transistor T1 is coupled to ground. A drive signal input terminal is coupled to a source (not shown) of a bistate drive signal. The drive signal input terminal is coupled to a first electrode of a second resistor R2. A second electrode of the second resistor R2 is coupled to the base electrode of the transistor T1. A photo-detector, which in the illustrated embodiment is a photodiode PD, is arranged to receive light emitted by the LED. An anode of the photodiode PD is coupled to the a first electrode of a resistor R3 and a cathode of the photodiode PD is coupled to a second electrode of the resistor R3.

In operation, the capacitor C1 operates as an energy storage device (104 of FIG. 1). The controllable current source $I_{IN}$ operates as a source of energy (102). The controllable current source $I_{IN}$ is coupled to the local power supply (not shown) and provides a controllable and substantially constant current to the capacitor C1. The transistor T1 operates as a switch. When the bistate drive signal is in a first state, e.g. is at a relatively low voltage (0 volts), the main conductive path of the transistor T1 is non-conductive (open circuit). In this state, current is supplied to, and electrical energy is stored in, the capacitor C1 from the controllable current source $I_{IN}$. When the bistate drive signal is in a second state, e.g. is at a relatively high voltage (e.g. 5 volts), thea main conductive path of the transistor T1 conducts (short circuit), thereby connecting the cathode of the LED to ground. In this state, a substantially constant current is drawn from the capacitor C1 through the LED. This causes the LED to emit light at a level depending upon the current level.

Typically, the current drawn by an LED (or any similar load circuit) is directly related to the voltage across the LED. That is, the higher the voltage across the LED, the higher the current conducted by the LED; and the lower the voltage across the LED, the lower the current conducted by the LED. An LED also has a threshold voltage. When the voltage across the LED is below the threshold, the LED remains non-conductive. Only when the voltage across the LED exceeds the threshold voltage does the LED become operative and conduct current.

The combination of the LED, second resistor R2, and transistor T1 operate as the switch circuit (106). Because the pulsed current is drawn from the capacitor C1, rather than from the local power supply, the current draw from the local power supply is substantially constant, eliminating or minimizing power supply crosstalk fluctuations in the voltage levels produced by the local power supply, and eliminating or minimizing noise induced by electronic (e.g. semiconductor) circuitry.

Figure 3:
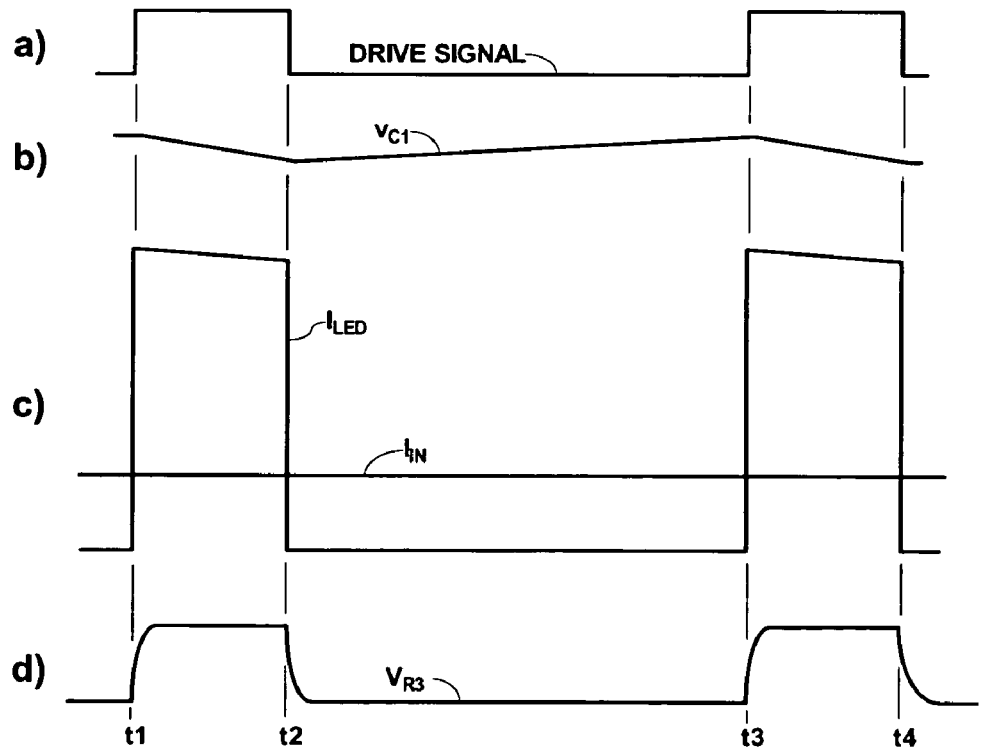
FIG. 3 is a set of waveform diagrams useful in understanding the operation of the pulse signal drive circuit according to principles of the invention illustrated in FIG. 2.

FIG. 3 is a set of waveform diagrams useful in understanding the operation of the pulse signal drive circuit according to principles of the invention illustrated in FIG. 2. Referring to both FIG. 2 and FIG. 3, FIG. 3a is the drive signal supplied to the base electrode of the transistor T1. Between times t2 and t3, the drive signal is zero volts. As described above, in this time interval, the transistor T1 becomes non conductive. During this time interval, a substantially constant current is supplied from the controllable current source $I_{IN}$ to the capacitor C1, as described above. This is illustrated as current $I_{IN}$ in FIG. 3c. Because the capacitor C1 is being charged, the capacitor voltage increases between times t2 and t3. This is illustrated as voltage $V_{C1}$ in FIG. 3b.

Between times t1 and t2, and between times t3 and t4, the drive signal becomes e.g. 5 volts. During these time intervals the substantially constant current continues to be supplied from the controllable current source $I_{IN}$ to the capacitor C1, as described above. This is illustrated as current $I_{IN}$ in FIG. 3c. However, also as described above, in these time intervals transistor T1 becomes conductive and a substantially constant current flows through the LED. The LED, in response, emits light during these time intervals, having an intensity depending on the amount of current flowing through it. This current is illustrated as $I_{LED}$ in FIG. 3c. Because the capacitor C1 is being discharged, the capacitor voltage decreases between times t1 and t2, and between times t3 to t4. This is illustrated as voltage $V_{C1}$ in FIG. 3b. Because the voltage across the capacitor C1 decreases between times t1 and t2, and between times t3 and t4, the current through the LED also decreases slightly during these time intervals (termed tilt).

Between times t1 and t2, and between times t3 and t4, the photodiode PD receives light from the LED and generates a current representing the intensity of the light received by the photodiode PD from the LED. This current is passed through the third resistor R3, which exhibits a voltage across it. This voltage is illustrated in FIG. 3d. Because of the characteristics of the photodiode PD, the received pulses exhibit a slow rise and slow decay. The voltage produced across the third resistor R3 is processed by further load circuitry (not shown). One skilled in the art understands that an integration function may be included in the load circuitry which minimizes the effect of the slow rise and decay of the received light representative signal.

As described above, the capacitor C1 operates in an equilibrium condition in which the average electrical energy received from the controllable current source is substantially equal to the average of the pulsed energy drawn from the capacitor C1 by the LED via the transistor T1. In FIG. 3c, the duty cycle of the pulse signal $I_{LED}$ is illustrated as 25%. In equilibrium the substantially constant current supplied by the controllable current source $I_{IN}$ is one-fourth of the substantially constant current drawn from the capacitor C1 by the LED via the transistor T1 between times t1 and t2, and between times t3 and t4.

As described above, the current conducted by the LED depends upon the voltage across the capacitor C1. At equilibrium, the voltage across the capacitor C1 conditions the LED to conduct during the conducting periods the appropriate substantially constant current to draw an average amount of energy from the capacitor C1 equal to the average amount of energy, represented by the substantially constant current, supplied to the capacitor C1 by the constant current source $I_{IN}$. For example, if the duty cycle is set to 25%, in the equilibrium condition, the voltage across the capacitor C1 conditions the LED to conduct between the times t1 to t2, and between times t3 and t4, four times the substantially constant current supplied to the capacitor C1 by the constant current source $I_{IN}$.

If the voltage across the capacitor C1 rises above the equilibrium voltage, the LED conducts a higher amount of current, as described above. In this condition, the average energy drawn from the capacitor C1 by the LED during conductive periods is greater than the average energy supplied to the capacitor C1 by the constant current source $I_{IN}$, causing the voltage across the capacitor C1 to drop. Conversely, if the voltage across the capacitor C1 drops below the equilibrium voltage, the LED conducts a lower amount of current, also as described above. In this condition, the average energy is flowing into the capacitor C1 from the constant current source $I_{IN}$ is greater than the average energy drawn from the capacitor C1 by the LED during the conductive periods, causing the voltage across the capacitor C1 to rise. In this manner, the voltage across the capacitor is maintained at a stable equilibrium level, with any perturbations tending to bring the voltage back to the equilibrium level.

If the setting of the substantially constant current from the constant current source $I_{IN}$ is changed, there is an initial adjustment period. If the newly set substantially constant current is higher than the previous setting, there is a net flow of energy into the capacitor, causing the voltage across the capacitor C1 to rise, in the manner described above. Conversely, if the newly set substantially constant current is lower than the previous current setting, there is a net flow of energy out of the capacitor C1, causing the voltage across the capacitor C1 to drop, in the manner described above. In either case, the adjustment period continues until the voltage across the capacitor C1 has reached the new equilibrium point.

The control of the LED optical output, therefore, is performed by setting the substantially constant current supplied by the controllable constant current source $I_{IN}$. Because no other circuitry is required to perform regulation of the LED optical output signal, there is very little electronic noise induced in the optical output signal, even at extremely low optical output levels.

Figure 4:
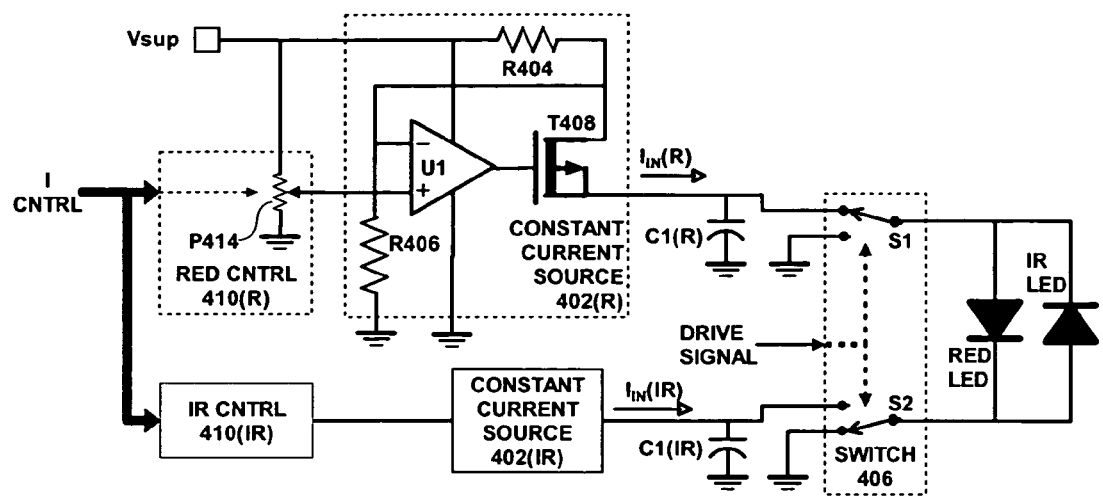
FIG. 4 is a more detailed schematic diagram of a portion of an $SpO_2$ patient monitoring device in which a pulse signal drive circuit according to principles of the present invention is implemented.

FIG. 4 is a more detailed schematic diagram of a portion of an SpO$_2$ patient monitoring device in which a pulse drive circuit according to principles of the present invention is implemented. In FIG. 4, only those elements necessary to illustrate the pulse signal drive circuits for the red LED and the IR LED are illustrated. One skilled in the art understands what other elements may be required, how to design an implement those elements, and how to connect those other elements to the elements illustrated in FIG. 4.

SpO$_2$ patient monitoring units include LEDs producing optical signals at two different optical wavelengths: the red range and the infrared (IR) range. Thus, two pulse signal drive circuits are provided in an SpO$_2$ patient monitoring device, one for a red LED and one for an IR LED. The upper portion of FIG. 4 illustrates a pulse signal drive circuit for the red LED and the bottom portion of FIG. 4 illustrates a pulse drive circuit for the IR LED. The right hand side of FIG. 4 illustrates the switching circuitry for supplying drive current to the red and IR LEDs. The pulse signal drive circuit for the red LED will be illustrated and described in detail below. One skilled in the art understands that the corresponding circuitry for generating the pulse signal for the IR LED is the same as that illustrated for the red LED. To simplify the figure, it is illustrated in block form in FIG. 4.

In FIG. 4, those elements which are the same as those illustrated in FIG. 2 are designated by the same reference number and are not described in detail. In FIG. 4, a voltage supply terminal Vsup is connected to a local power supply (not shown). The voltage supply terminal Vsup is coupled to a first electrode of a resistance element of a potentiometer P414 in a red current control circuit 410(R), to a power terminal of an operational amplifier (op amp) U1, and to a first electrode of a resistor R404. A reference potential terminal of the op amp U1 and a second electrode of the resistance element of the potentiometer P414 are coupled to ground. A wiper terminal of the potentiometer P414 is coupled to the non-inverting input terminal of the op amp U1. A current control input terminal I CNTRL is coupled to a source (not shown) of a current control signal. The current control input terminal I CNTRL is coupled to a control input terminal of the red current control circuit 410(R) and controls the position of the slider on the resistance element of the potentiometer P414.

A second electrode of the resistor R404 is coupled to an inverting input terminal of the op amp U1, a drain electrode of a p-channel MOSFET T408, and a first electrode of a resistor R406. A second electrode of the resistor R406 is coupled to ground. An output terminal of the op amp U1 is coupled to a gate electrode of the MOSFET T408. The combination of the op amp U1, resistors R404 and R406 and MOSFET T408 form a constant current source. A source electrode of the MOSFET T408 produces the substantially constant current signal for generating the red LED pulse signal.

Similarly, the current control input terminal I CNTRL is coupled to an input terminal of a IR current control circuit 410(IR). An output terminal of the IR current control circuit 410(IR) is coupled to a control input terminal of an IR constant current source 402(IR). An output terminal of the IR constant current source 402(IR) produces the substantially constant current signal for generating the IR LED pulse signal.

The source electrode of the MOSFET T408, generating the substantially constant current signal $I_{IN}(R)$ for the red LED, is coupled to a first electrode of a capacitor C1(R) and a first throw terminal of a first single pole double throw (SPDT) switch S1. A second electrode of the capacitor C1(R) and a second throw terminal of the first SPDT switch S1 are coupled to ground. A pole terminal of the first SPDT switch S1 is coupled to an anode of a red LED and a cathode of an IR LED. The output terminal of the IR constant current source 402(IR), generating the substantially constant current signal $I_{IN}(IR)$, is coupled to a first electrode of a capacitor C1(IR) and a first throw terminal of a second SPDT switch S2. A second electrode of the capacitor C1(IR) and a second throw terminal of the second SPDT switch S2 are coupled to ground. The pole terminal of the second SPDT switch S2 is coupled to an anode of the IR LED and a cathode of the red LED. The first and second SPDT switches S1 and S2 form a switch circuit 406. A drive signal input terminal is coupled to a control input terminal of the switch circuit 406. The drive signal operates to independently control the positions of the first and second SPDT switches S1 and S2.

In operation, the red current control circuit 410(R) provides a current control signal in the form of a voltage signal having a voltage value between ground and the supply voltage Vsup. In the illustrated embodiment, the current control input signal I CNTRL is a digital signal. More specifically, in the illustrated embodiment, the I CNTRL digital signal is an eight-bit signal, for providing a current control signal having 256 voltage levels between Vsup and ground. The op amp U1 generates a voltage signal responsive to the red current control signal. This signal is supplied to the gate electrode of the MOSFET T408, which, in response, conducts a substantially constant current having a value corresponding to the voltage of the gate voltage signal.

The drive signal conditions the switches S1 and S2 to provide three operational states: the red LED conducting and producing an optical signal; the IR LED conducting and producing an optical signal; and the red and IR LEDs off. Typically, these states are repetitively sequenced in the following order: red and IR LEDs off; red LED on; red and IR LEDs off; IR LED on; and so forth. To produce the condition in which the red LED is on, the first SPDT switch S1 is conditioned by the drive signal to connect the first throw terminal to the pole, connecting the capacitor C1(R) to the anode of the red LED; and the second SPDT switch S2 is conditioned by the drive signal to connect the second throw terminal to the pole, connecting the cathode of the red LED to ground (as illustrated in FIG. 4). The red LED, thus, is rendered conductive, as illustrated in FIG. 3c between times t1 and t2, and between times t3 and t4. The IR LED is reversed biased and is non-conductive. As described above, the duty cycle for the red LED to remain conductive is 25%.

To produce the condition in which the IR LED is conductive, the first throw terminal of the second SPDT switch S2 is connected to the pole, connecting the capacitor C1(IR) to the anode of the IR LED, and the second throw terminal of the first SPDT switch S1 is connected to the pole, connecting the cathode of the IR LED to ground. The IR LED is, thus, rendered conductive. The red LED is reversed biased and is non-conductive. The duty cycle for the IR LED to remain conductive is also 25%. To produce the condition in which both LEDs are off, the second throw terminal of the first SPDT switch S1 is connected to the pole, and the second throw terminal of the second SPDT switch S2 is connected to the pole, grounding anodes and cathodes of respective red and IR LEDs. In this state, the red LED and IR LED are isolated from their corresponding capacitors (C1(R) and C1(IR)). In this state, the substantially constant current from the respective constant current sources 402(R) and 402(IR) supply current to the respective capacitors C1(R) and C1(IR), as illustrated in FIG. 3c between times t2 and t3.

Table 1 (below) displays values and part numbers for the elements illustrated in FIG. 4. Using the values illustrated in Table 1, the current control voltage signal from the red and IR current control circuits 410(R) and 410(IR) runs from 0 to 4 volts in 256 steps. These current control signals induce substantially constant currents from 0 to 14 milliamps from the respective constant current sources 402(R) and 402(IR). At a 25% duty cycle, this results in red and IR LED currents from 0 to 46 milliamps.

TABLE 1

| Component | Description |
| --- | --- |
| Vsup | 4 volts |
| Current control circuit 410 | AD5207 - Dual, 256 Position, Digital Potentiometer manufactured by Analog Device, Inc., Norwood, MA. |
| Op amp U1 | AD8603 - Precision Single MicroPower Rail to Rail Input/Output Low Noise CMOS Operational Amplifier manufactured by Analog Device, Inc., Norwood, MA. |
| MOSFET T408 | FDC5420C - 20 V N & P-Channel PowerTrench MOSFET manufactured by Fairchild Semiconductor Corporation, South Portland, ME. |
| Switch 406 | MAX4685 Dual SPDT Analog Switches, manufactured by Maxim Integrated Products, Inc. of Sunnyvale, CA. |
| R404 | 10 ohms |
| R406 | 178k ohms |
| C1(R) and C1(IR) | 680 microfarads |

The present invention has been described above with reference to an embodiment in which the energy storage device is a capacitor. One skilled in the art understands that other energy storage devices may also be used. For example, an inductor storing energy in the form of a current, or a battery storing energy in the form of chemical energy, or any other such energy storage device may be used instead. One skilled in the art further understands that it is possible to take advantage of the characteristic tilt in the LED pulse current signal $I_{LED}$ (FIG. 3c) to at least partially compensate for the slow rise of the photodiode signal (FIG. 3d).

A pulse drive signal generating system according to principles of the present invention also finds use in other applications where low noise during low current operational conditions is important. For example, such a circuit finds use in a respiration monitoring device for periodically pulsing a bridge transducer, and so forth.

What is claimed is:

1. A pulse signal drive circuit, comprising:
   a source of energy, said source of energy including a controllable current source;
   an energy storage device, coupled to the energy source, for receiving a substantially constant flow of current from the current source, said energy storage device including a capacitor;
   a switch circuit including a series connection of a load circuit and a switch, coupled to the energy storage device, for drawing repetitive pulses of substantially constant current from the energy storage device to generate corresponding pulse signals, said load circuit including a light emitting diode (LED) and said switch including a transistor having a main conductive path coupled between said LED and a source of common voltage (ground); and
   a source of a bistate drive signal coupled to the transistor for conditioning the main conduction path of the transistor to not conduct in response to a first state of the bistate drive signal and to conduct in response to a second state of the bistate drive signal.

2. The circuit of claim 1 wherein:
   the capacitor exhibits a voltage depending on the amount of energy stored in it; and
   the load circuit draws a current directly related to the voltage across the capacitor.

3. The circuit of claim 1 wherein the energy storage device is maintained in an equilibrium condition.

4. The circuit of claim 3 wherein the average substantially constant flow of energy from the energy source to the energy storage device is substantially equal to the average energy drawn from the energy storage device in the repetitive pulses of substantially constant energy.

5. A pulse signal drive circuit, comprising:
   a source of energy, said source of energy including a controllable current source;
   an energy storage device, coupled to the energy source, for receiving a substantially constant flow of current from the current source, said energy storage device including a capacitor; and
   a switch circuit including a series connection of a load circuit and a switch, coupled to the energy storage device, for drawing repetitive pulses of substantially constant current from the energy storage device to generate corresponding pulse signals,
   the load circuit comprises a light emitting diode (LED);
   the series connection comprises the series connection of a first single-pole-double-throw switch, the LED, and a second single-pole-double-throw switch coupled between the capacitor and a source of a common voltage (ground).

6. The circuit of claim 5 further comprising a source of a drive signal coupled to the first and second single-pole-double-throw switches for conditioning the LED to not conduct in response to a first state of the drive signal and conditioning the LED to conduct in response to a second state of the drive signal.

7. In an SpO$_2$ patient monitoring system including at least one LED for producing optical pulse signals, a pulse signal drive circuit coupled to the LED and comprising:
   a controllable current source;
   a capacitor, coupled to the controllable current source, for receiving a substantially constant current from the current source; and
   a switch circuit, coupled to the capacitor and the LED for drawing repetitive pulses of substantially constant current from the capacitor, and providing the pulses to the LED to condition the LED to produce optical pulse signals, the switch circuit comprises the series connection of a first single-pole-double-throw switch, an LED and a second single-pole-double-throw switch.

8. The system of claim 7 wherein the switch circuit comprises the series connection of an LED and the main conduction path of a transistor.

9. The system of claim 7 further comprising a source of a bistate drive signal, coupled to the transistor, for conditioning the main conductive path of the transistor to not conduct in response to a first state of the bistate drive signal, and to conduct in response to a second state of the bistate drive signal.

10. The system of claim 7 wherein the capacitor is maintained in an equilibrium condition.

11. The system of claim 10 wherein the average current of the substantially constant current received by the capacitor from the current source is substantially equal to the average current of the repetitive pulses of substantially constant current from the switch circuit.

12. In an $SpO_2$ patient monitoring system including at least one LED for producing optical pulse signals, a pulse signal drive circuit coupled to the LED and comprising:

a controllable current source;

a capacitor, coupled to the controllable current source, for receiving a substantially constant current from the current source; and a switch circuit, coupled to the capacitor and the LED for drawing repetitive pulses of substantially constant current from the capacitor, and providing the pulses to the LED to condition the LED to produce optical pulse signals, a second LED;

a second controllable current source; and a second capacitor, coupled to the second controllable current source, for receiving a substantially constant current from the second current source; wherein:

the switch circuit is further coupled to the second capacitor and the second LED for drawing repetitive pulses of substantially constant current from the second capacitor, and providing the pulses to the second LED to condition the second LED to produce optical pulse signals.

13. The system of claim 12 wherein the switch circuit comprises the series connection of a first single-pole-double-throw switch, the parallel connection of the first mentioned LED and the second LED, and a second single-pole-double-throw switch.

14. The system of claim 13 wherein:

an anode of the first mentioned LED is coupled to a cathode of the second LED and the cathode of the first mentioned LED is coupled to the anode of the second LED; and further comprising:

a source of a drive signal, coupled to the first and second single-pole-double-throw switches, for conditioning the first mentioned LED to conduct in a first operational state, conditioning the second LED to conduct in a second operational state; and conditioning the first mentioned LED and the second LED to not conduct in a third operational state.

* * * * *